United States Patent
Charles et al.

(10) Patent No.: US 9,454,287 B2
(45) Date of Patent: *Sep. 27, 2016

(54) KNOWLEDGE-BASED POLYMORPH UNDOCKABLE TOOLBAR

(75) Inventors: Bernard Charles, Feucherolles (FR); Jean-Christophe Cros, Boulogne-Billancourt (FR); Gregoire Debaisieux, Paris (FR); Francois Perroux, Sevres (FR)

(73) Assignee: DASSAULT SYSTEMES, Suresnes (FR)

( * ) Notice: Subject to any disclaimer, the term of this patent is extended or adjusted under 35 U.S.C. 154(b) by 1668 days.

This patent is subject to a terminal disclaimer.

(21) Appl. No.: 12/889,992

(22) Filed: Sep. 24, 2010

(65) Prior Publication Data

US 2011/0016434 A1    Jan. 20, 2011

Related U.S. Application Data

(60) Continuation of application No. 10/428,403, filed on May 1, 2003, now Pat. No. 7,823,085, which is a division of application No. 09/329,727, filed on Jun. 10, 1999, now Pat. No. 6,597,382.

(51) Int. Cl.
  *G06F 3/0481* (2013.01)
  *G06F 3/0482* (2013.01)
  (Continued)

(52) U.S. Cl.
  CPC .......... *G06F 3/0482* (2013.01); *G06F 3/0481* (2013.01); *G06F 3/04815* (2013.01); *G06T 19/003* (2013.01); *G06T 19/20* (2013.01); *G06T 2219/2016* (2013.01); *Y10S 715/964* (2013.01)

(58) Field of Classification Search
  CPC .......... G06F 3/04845; G06F 3/04812; G06F 3/04842; G06T 19/003
  USPC ................ 715/850, 823, 785–787, 821–822, 715/824–830, 837, 840, 744–747, 782, 836, 715/848–849, 851–852, 859–862, 964; 345/160–163, 650–655, 676–681
  See application file for complete search history.

(56) References Cited

U.S. PATENT DOCUMENTS

| 4,661,810 A | 4/1987 | Himelstein et al. |
| 5,526,478 A | 6/1996 | Carey et al. |

(Continued)

FOREIGN PATENT DOCUMENTS

| JP | 06-231226 | 8/1994 |
| JP | 07-056971 | 3/1995 |

(Continued)

OTHER PUBLICATIONS

U.S. Appl. No. 90/010,339, filed Nov. 13, 2008, Charles, et al.

(Continued)

*Primary Examiner* — Steven Sax
(74) *Attorney, Agent, or Firm* — Oblon, McClelland, Maier & Neustadt, L.L.P.

(57) ABSTRACT

A software control method and apparatus for implementing a knowledge-based polymorph undockable toolbar within an object scene. The undockable toolbar can be used to perform actions on objects created and managed by computer software applications. A knowledge-based polymorph undockable toolbar can merges into a relatively small area, tools for executing various commands that would require substantial screen space if represented by standard icons on a toolbar. The present invention can be used to manipulate non-constrained objects or groups of objects included in an assembly that are linked to each other by constraints. The knowledge based polymorph undockable toolbar can also act to reduce the number of user interactions needed to perform a manipulation task.

44 Claims, 13 Drawing Sheets

(51) Int. Cl.
*G06T 19/00* (2011.01)
*G06T 19/20* (2011.01)

(56) References Cited

U.S. PATENT DOCUMENTS

| | | |
|---|---|---|
| 5,588,098 A | 12/1996 | Chen et al. |
| 5,631,840 A | 5/1997 | Ooka et al. |
| 5,664,216 A | 9/1997 | Blumenau |
| 5,801,704 A | 9/1998 | Ejiri et al. |
| 5,828,376 A | 10/1998 | Solimene et al. |
| 5,861,889 A * | 1/1999 | Wallace et al. ............... 345/619 |
| 5,956,045 A | 9/1999 | Gotoh et al. |
| 5,970,482 A | 10/1999 | Pham et al. |
| 6,005,576 A * | 12/1999 | Kojima ..................... G06F 8/34 715/810 |
| 6,026,397 A | 2/2000 | Sheppard |
| 6,031,529 A | 2/2000 | Migos et al. |
| 6,046,749 A * | 4/2000 | Andersson ................... 345/648 |
| 6,054,999 A | 4/2000 | Strandberg |
| 6,204,840 B1 | 3/2001 | Petelycky et al. |
| 6,272,672 B1 | 8/2001 | Conway |
| 6,308,144 B1 | 10/2001 | Bronfeld et al. |
| 6,313,838 B1 | 11/2001 | Deering |
| 6,396,517 B1 | 5/2002 | Beck et al. |
| 6,426,745 B1 * | 7/2002 | Isaacs et al. ................. 345/419 |
| 6,448,964 B1 * | 9/2002 | Isaacs et al. ................. 345/419 |
| 6,556,783 B1 | 4/2003 | Gelphman |
| 6,762,778 B1 | 7/2004 | Golibrodski et al. |
| 2002/0085041 A1 | 7/2002 | Ishikawa |

FOREIGN PATENT DOCUMENTS

| | | | |
|---|---|---|---|
| JP | 08249490 A | * | 9/1996 |
| JP | 08-329283 | | 12/1996 |
| JP | 10-293864 | | 11/1998 |
| WO | WO 96/05097 A1 | | 2/1996 |

OTHER PUBLICATIONS

NB930923 IBM Technical Disclosure Bulletin, "Multi-Directional Scroll Method for Navigating in Seemingly Boundless Two Dimensional Area" vol. 36 Issue 9B, Sep. 1993.

Stork A., et al.: "Efficient and Precise Sold Modelling Using a 3D Input Device" Proceedings of the Fourth Symposium on Solid M . . . Atlanta, GA, May 14-16, 1997 pp. 181-194.

"Cursor used to show navigation and movement in three dimensional space" IBM Technical Disclosure Bulletin, IBM Corp. New York, US, vol. 40, No. 5, May 1, 1997 pp. 47-48.

European Search Report dated Feb. 19, 2004.

Emmerik, Maarten J. "A Direct Manipulation Technique for Specifying 3D Objects Transformations with a 2D Input Device." Computer Graphics Forum 9, 355-361 (1990).

Houde, Stephanie. "Iterative Design of an Interface for Easy 3-D Direct Manipulation." Human Interface Group, Advanced Technology Apple Computer, Inc. 135-142 (May 3-7, 1992).

Chen et al., "A Study in Interactive 3-D Rotation Using 2-D Control Devices, Computer Graphics," vol. 22, No. 4, pp. 121-129 (1998) (3-D rotation).

* cited by examiner

KNOWLEDGE-BASED POLYMORPH UNDOCKABLE TOOLBAR

CROSS-REFERENCE TO PRIORITY APPLICATIONS

The application is a continuation application of U.S. Ser. No. 10/428,403 entitled "Knowledge-Based Polymorph Undockable Toolbar," filed May 1, 2003, the entire content of which is incorporated herein by reference. U.S. Ser. No. 10/428,403 is a divisional application of U.S. Ser. No. 09/329,727 entitled "Knowledge-Based Polymorph Undockable Toolbar," filed Jun. 10, 1999.

BACKGROUND

The present invention relates to computer software utility programs, and more specifically to performance of actions on objects in software systems having a graphical interface.

Performance of actions on objects can require acting directly on one or more characteristics of an object. Individual devices available to a user for acting on object characteristics have limited capabilities, for example, moving the mouse can only act simultaneously on two independent characteristics, an X and Y axis.

To modify a greater number of characteristics a user will have to subdivide the global modification into a succession of elementary manipulations involving a number of characteristics, each characteristic compatible with the capabilities of an available device. To achieve a desired overall manipulation, a user may need to interact with several devices (keyboard, mouse buttons, joysticks, touchpads, etc.) and/or with other elements of a user interface (command buttons, menu items, dialog boxes items, handles, etc.) to move from one elementary manipulation to the next.

In some existing software applications, a number of displacement actions can be controlled by different buttons on a toolbar. Activating one button will cause the corresponding type of displacement to be applied to the objects in the scene. The drawback of this is that the user has to constantly move to and from a toolbar and the selected object.

Other existing software applications provide for handles to appear around an object to be displaced. Performance of actions on an object has been achieved directly on the scene through manipulation of the handles surrounding an object. The handles generally reflect the size and shape of the object. However, in complex arrangements, the number of handles on a scene and their surrounding presence around the objects can become a nuisance to a user trying to discern the overall object structure. The user can be hampered in the performance of other parallel actions. Moreover, the handles are generally oriented according to a reference system which is defined by the object selection and cannot be directly modified in context by the user. Another drawback of such applications is that displaying handles may require significant processing time if the number of selected objects is high.

It would be useful to have a single, compact representation of a programmable tool which allows the user to perform several actions on selected objects in a scene.

SUMMARY OF THE INVENTION

Accordingly, the present invention provides a software control method and apparatus for implementing a knowledge-based polymorph undockable toolbar which can be used to perform actions on objects created and managed by computer software applications. A knowledge-based polymorph undockable toolbar merges into a small space tool for executing various commands that would require substantial screen space if represented by standard icons on a toolbar and can be used to manipulate objects or groups of objects. The knowledge based polymorph undockable toolbar can also act to reduce the number of user interactions needed to perform a manipulation task.

The present invention includes a method of acting upon an object displayed on a computer screen, including imbedding a software tool into an object scene, wherein the software tool includes multiple user interactive areas. Each area can be associated with a function for acting upon the object. A user can activate an area causing the program to perform the function associated with the activated interactive area on the object.

Generally, in one aspect, a function performed can be responsive to knowledge based criteria relating to the object on which the function is performed. In addition, a second software tool can be displayed in an area of the object scene remote from the first software tool and the first software tool can be controlled with the second software tool.

In another aspect, the software tool can be moved off the object scene and individual visual representations, each associated with a function of the software tool, can be displayed. The visual representations can also be used to execute the individual functions. In addition the individual visual representations can be transferred back into the object scene and morphed into the software tool.

This invention can also include manipulating a particular user interactive area of the software tool to change the position of the software tool with respect to the objects in the object scene responsive to the manipulation of the particular user interactive area. One convenient interactive area that can be used for such manipulation is a tool anchor.

In one embodiment, one or more objects in the object scene can be selected and a function associated with an activated interactive area can be executed on the objects selected.

In another aspect of the invention, a knowledge-based polymorph undockable toolbar can contain an anchor which allows a user, by a simple drag-and-drop operation, to change the reference point on an object. A knowledge-based polymorph undockable toolbar can also be used as a linking mechanism to connect selected objects with other objects in a scene. In one specific embodiment, a command device, such as the control key on a keyboard, can be activated to effect the alignment.

In another specific embodiment, a computer system software tool for facilitating positioning of a selected object on a computer screen can include three axis, each axis perpendicular to one another wherein each axis controls translational movement of the object. In addition this embodiment can include three arcs, each arc intersecting two axis, and wherein each arc controls rotational movement of the object and three planes, wherein each plane is defined by the intersection of two axis and each plane controls planar movement of the object. The software tool can also include an anchor for attaching the tool to the object and a free rotation handle.

In one aspect of the invention, a tool anchored to an object can manipulate the position of the attached object responsive to actuation of the tool. An unanchored tool can manipulate all objects displayed on the screen responsive to actuation of the tool.

In addition, the software tool can be aligned with an absolute axis or positioned and oriented onto an object such that the object can be directly manipulated by activation of the tool. In one embodiment, the position and orientation of the tool can be determined by context sensitive, semantical object interpretation. En addition, an axis indicator can cause an axis associated with an indicator to be perpendicular to the screen.

This invention can also embody a computer system, a programmed computer, a computer program residing on a computer-readable medium or a method of interacting with a computer and embodying the concepts described above.

The details of one or more embodiments of the invention are set forth in the accompanying drawings and the description below. Implementations can provide advantages such as the capability of efficiently manipulating objects in an object scene. Other features, objects, and advantages of the invention will be apparent from the description, the drawings and the claims.

DETAILED DESCRIPTION OF THE INVENTION

Figure 1:
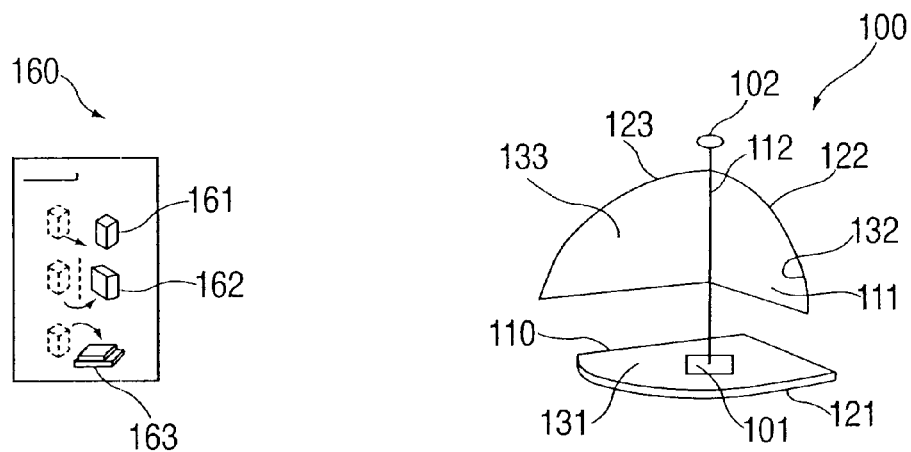
FIG. 1 is an exemplary illustration of a knowledge-based polymorph undockable toolbar Compass and associated icons according to this invention.

A computer system can display one or more objects in an object scene on a computer display. A user accessing the computer system can select one or more of the objects and perform an action on the selected objects. To facilitate the performance of an action on an object, a multi-functional tool can be displayed in the object scene. The multi-function tool can include two or more user interactive areas responsive to selection with a pointing device. Each user interactive area can be programmed to perform a predetermined action upon activation by the user. In addition, a predetermined action can be knowledge based, such that it is further defined according to the context of the scene in which the action is to called to be performed.

Generally, a knowledge-based polymorph undockable tool bar can be represented in the scene of an object display window in the form of a multifaceted tool, wherein each facet of the tool represents a different functionality. The tool embodies a compact representation of multiple functionalities that can be located in close proximity of an object on which the functionality will be exercised. Each functionality of the tool is designed to effect a change on one or more objects of the scene in which the tool has been immersed. Immersion of the tool in the scene, allows the tool to behave like other objects of the scene in many respects. For example, as the view of the scene is changed through rotation or transactional movement of the view, the view of the tool immersed in the scene will change accordingly.

In one embodiment, a remote control of a tool that is immersed in an object scene can be made to appear in a portion of the scene that is otherwise vacant. The remote control can be used to access the functionality of a knowledge based polymorph undockable tool bar that is immersed in a scene and has become difficult to view or otherwise be accessed. Difficulty in accessing an undockable toolbar can be, for example, the result of a scene crowded with objects or movement of an object with the undockable toolbar attached to an inaccessible area of the scene. In one referred embodiment, the location of the remote control is in the upper right hand corner of the scene.

In addition, icons or other visual representations of functionalities performable by the tool can be displayed as separate commands in a portion of the screen outside the object scene. The separate commands can be displayed for example by dragging and dropping a multi-functional tool on a side bar of the screen wherein a toolbar can appear as separate icons, each icon representing a functionality present in the knowledge based polymorph undockable toolbar. Similarly, a multi-icon toolbar peripheral to the object scene can be programmed such that dragging the toolbar into the object window causes the individual selections of the toolbar to be morphed into a single multi-functional toolbar that is immersed in the object scene.

Optionally, a knowledge based polymorph undockable toolbar immersed in an object scene, can be anchored or otherwise attached to one or more objects contained in the object scene. Activation of a user interactive portion of the undockable toolbar can cause an function associated with that portion of the toolbar to be performed on the selected objects.

Each object displayed in the object scene, can have a default anchor point onto which a knowledge based polymorph undockable toolbar can attach. A user can drag and drop, or otherwise move, the undockable toolbar to the object and upon release the undockable toolbar will anchor to the default anchor point. In addition, a user can override the default and attach the undockable toolbar to an alternate anchor point selected by the user. The anchor point can define a reference for action to be performed upon the object. In addition, activation of an undockable toolbar function, such as a function causing movement in an object, can be combined with the activation of a command key, or other control device, to create a link between objects. Command keys can include for example, depressing the Control key on a keyboard.

Links created between objects can also be knowledge based programmed such that they are defined in the context of the objects or the application. For example, two pipes that are linked may be programmed such that a predetermined link attaches the pipes at the extremities. Similarly, an electrical connector can be programmed to align with a receptacle.

Knowledge based polymorph undockable toolbar functionality can include for example, translational movement, rotational movement, planar movement, aperture creation, distant measuring devices, appendage creation, or any other tool that can be programmed to take action within the object scene.

Referring now to FIG. 1, one example of a knowledge-based polymorph undockable toolbar can include a GUI Compass tool. A compass tool can be displayed on a computer screen and used to manipulate objects also displayed on the screen. The Compass can include multiple user interactive areas or parts for causing an action to be effected on one or more objects displayed on the computer screen. For example, interactive parts of the Compass can include a manipulation handle or anchor 101, and a free rotation handle 102. Compass arcs intersecting the various axis such as an XY arc 121 intersecting the X and Y axis, a ZY arc 122 intersecting the Z and Y axis, and a ZX arc 123 intersecting the Z and X axis can also be included.

Selection of an axis with a pointing device can cause an associated object, or multiple objects to move translationally in the direction of the axis. Similarly, selection of an arc can cause an associated object or objects to move rotationally in the direction specified by the arc.

A plane defined by the intersection of an arc 121-123 and two of the axis 110-112 can also be used for object manipulation. Activation of a plane can cause objects associated with the compass to move along the direction of the plane activated. A privileged plane can also be designated. In one preferred embodiment the privileged plane is the XY plane 131 which contains the anchor 101. Other planes that can be specified as the privilege plane include the ZY plane 132 and the ZX plane 133.

In one embodiment, icons 161-163 located on a toolbar 160 can effect an action the same as the action caused by user activation of a part of the compass. For example, an icon for causing translational movement 161 can effect a similar action as activating an axis 110-112 on the Compass tool 100, an icon for causing rotation 162 can effect a similar action as activating an arc 121-123 on the Compass tool 100 and an icon 163 for causing planar movement 163 can effect a similar action as activating a plane 131-133 on the Compass tool.

Figure 2:
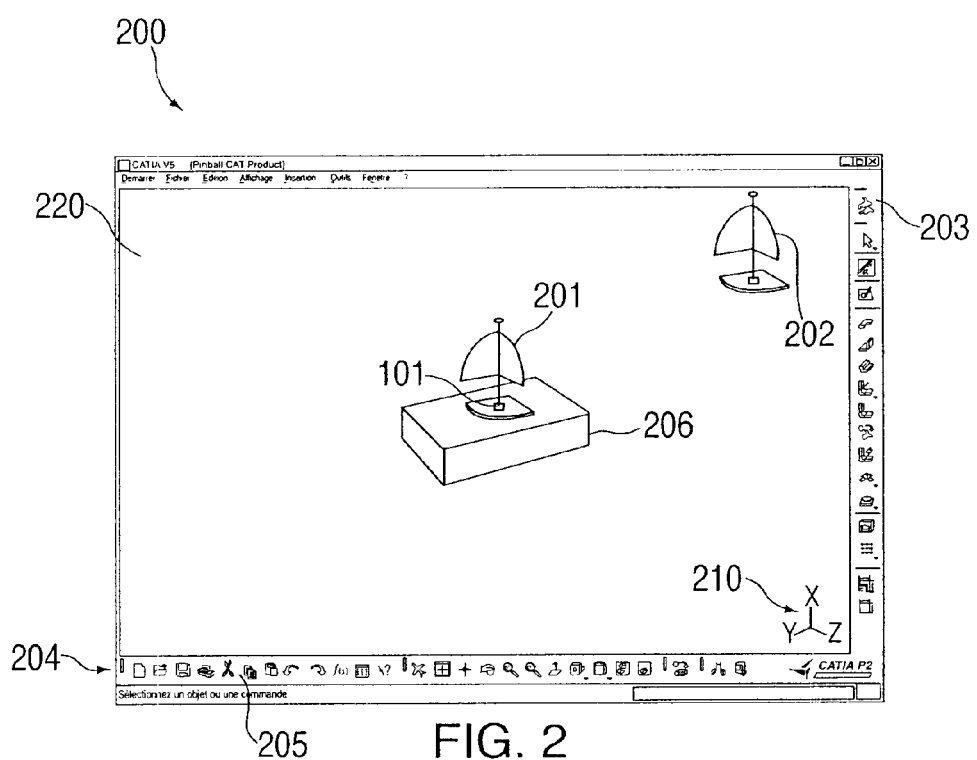
FIG. 2 is an illustration of a knowledge-based polymorph undockable toolbar in an object scene.

Referring now to FIG. 2, a computer display 200 can include an object scene 220 and one or more toolbars 204, with each toolbar 204 containing one or more icons 205. The object scene can include an absolute axis 210 to aid in orienting objects, such as the block 206. The object scene can also include a knowledge-based polymorph undockable toolbar, such as a GUI Compass 201 & 202.

A Compass 202 can have a default position such as the upper right hand corner of the screen. As an object 206 in the scene is selected, a GUI Compass 201 can be located in close proximity to the object 206 selected. In another embodiment, the anchor can be located on a closest geometrical point as defined by the location of the cursor, for example an extremity of a line. In still another embodiment, as illustrated in FIG. 2, the Compass 201 is positioned such that the anchor 101 is located at the center of gravity of the object selected.

The anchor can also be located at a point which is defined by the object itself. In one preferred embodiment, the compass can attempt recognize the characteristics of the current object. Characteristics can take into account the context of the current object and check for the highest semantical information. Anchor points indicated by semantical information can be defined by the software or the user.

Anchoring the GUI Compass to an object allows a user to move the object with translation and rotation movements. Movement in this context includes redefining the spatial coordinates of the object with respect to the absolute axis system of the document. In still another embodiment the Compass can be permanently displayed in a corner of the window and used as a remote control for a Compass on an object.

The screen can also include an intrinsic X axis 110, Y axis 111 and Z axis 112, each axis being representative of a dimension and functional for translational movement.

Figure 3:
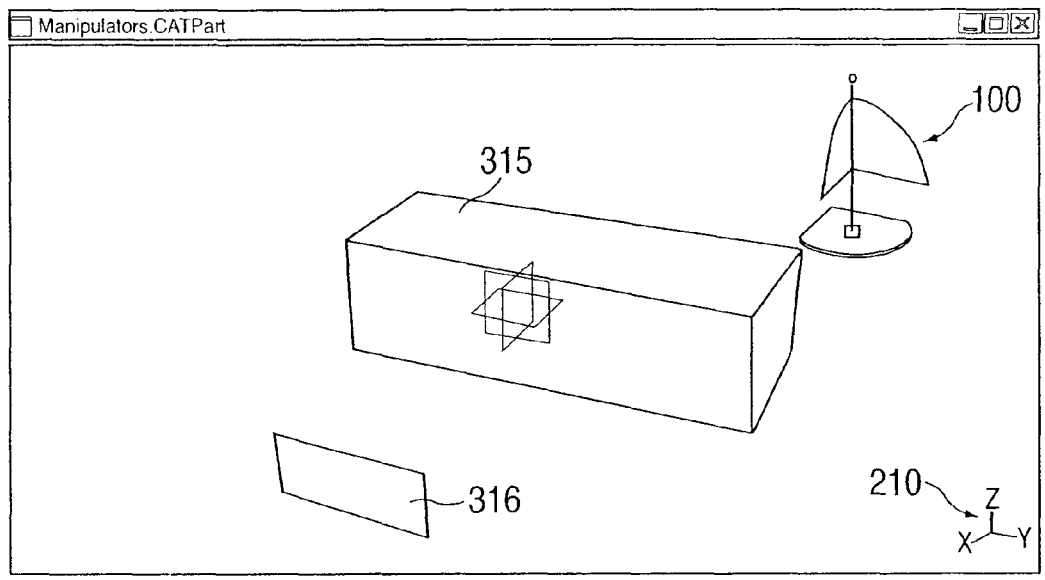
FIG. 3 is an illustration of an unattached GUI Compass.

Referring now to FIG. 3, in one embodiment, the GUI Compass can remain unattached to any particular object in the document. An unattached GUI Compass can, by default, be identically aligned with an absolute axis 210. The absolute axis 210 is typically located at the lower right hand corner of the screen. All objects included in the document will move in unison responsive to movement of an unattached GUI Compass. Referring again to FIG. 3 this would include objects 315 and 316.

Figure 4:
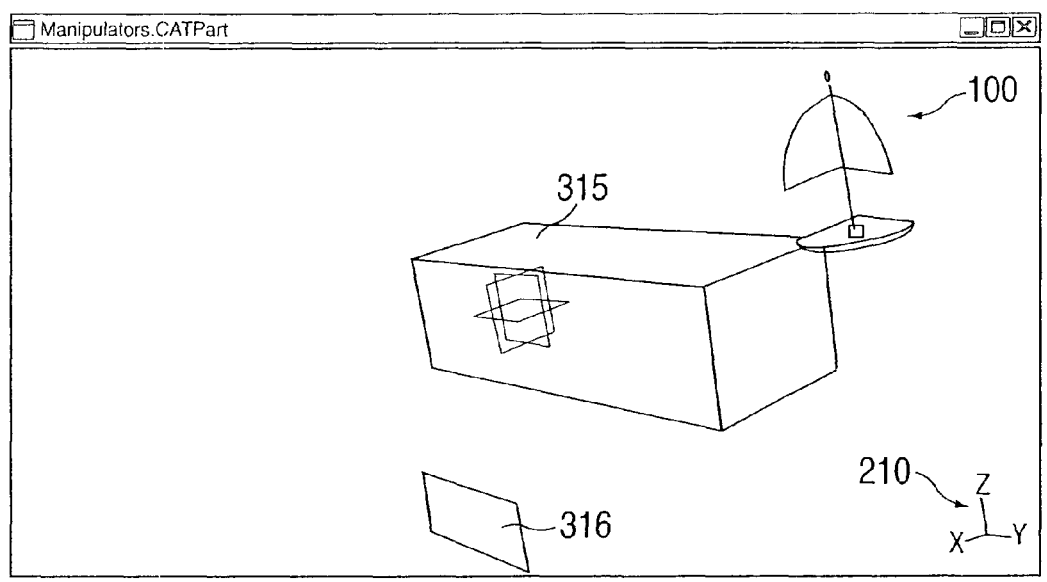
FIG. 4 is an illustration of movement resultant from an unattached GUI Compass.

Referring now to FIG. 4, the Compass 100 has remained in the same relative position to the objects 315 and 316. As illustrated, movement of an unattached GUI Compass causes all elements of the document to move in unison.

Different movements can be imparted by selection and dragging of the different components making up the GUI Compass 100. As a cursor is dragged over a part of a GUI Compass, the cursor can change in physical appearance. Changes in physical appearance can include for example an alternate cursor shape or color. In one embodiment, cursor appearance can include a pointed finger that appears as the cursor is moved over an element or part of a GUI Compass. In addition, the elements of a Compass can be highlighted as they are pointed to. Elements can include a Compass axis, an arc on the plane of the Compass, or the plane of the Compass itself.

Figure 5:
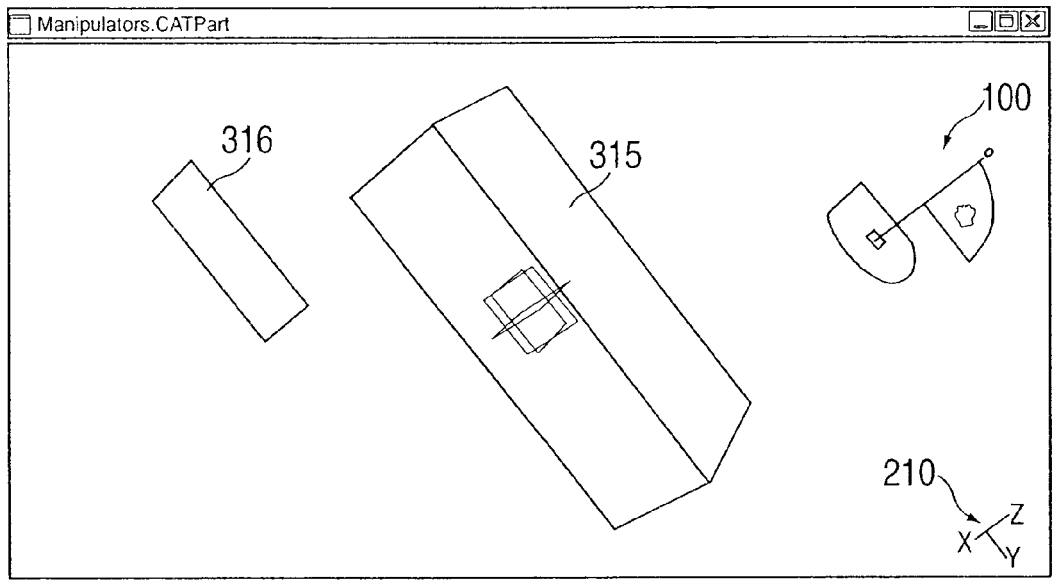
FIG. 5 illustrates movement caused by dragging an YZ arc.

Referring now to FIG. 5, as an example of movement caused by the GUI Compass, dragging the arc YZ to the right can rotate the objects in an arc about the X axis and through the anchor point. In one embodiment, dragging close to the anchor square can rotate the objects quickly and dragging further away from the anchor square 101 can rotate the objects more slowly. In addition, the absolute axis 210 can rotate responsive to the movement of the GUI Compass.

Figure 6:
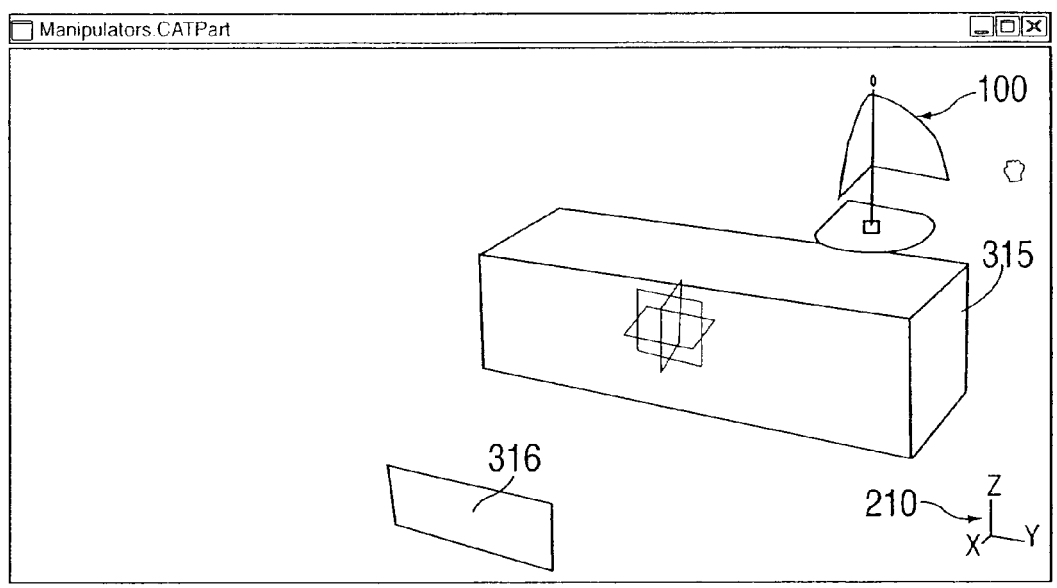
FIG. 6 illustrates movement caused by dragging a ZY plane.

FIG. 6 illustrates an example of moving the objects responsive to dragging to the right the ZY plane 132 subtended by the arc ZY. The objects 315 and 316 can be moved across the screen in correlation with the movement of the GUI Compass 100 as a result of dragging on the ZY plane 132.

Figure 7:
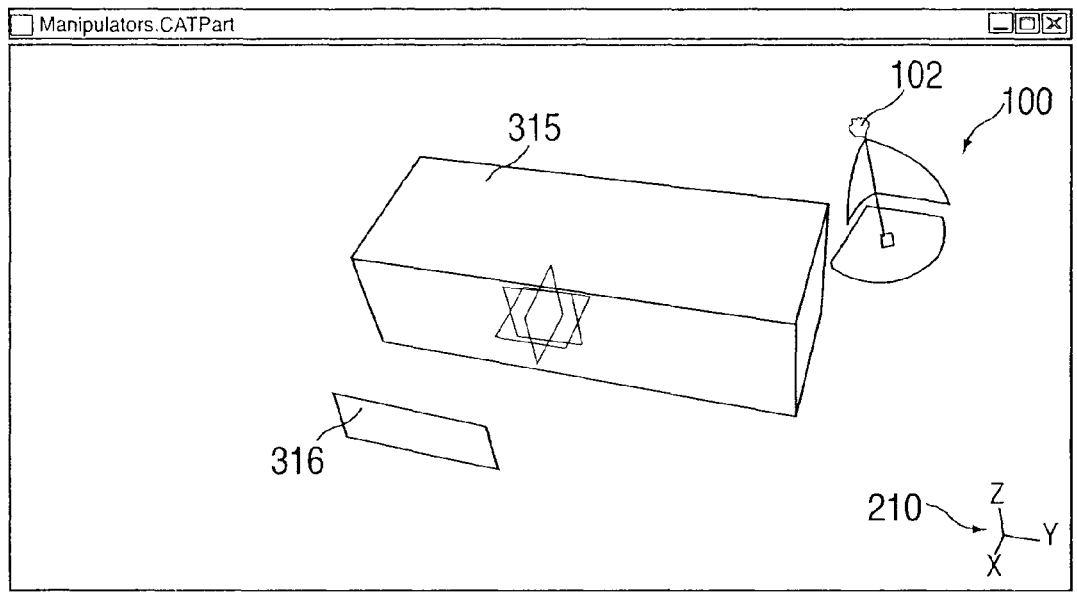
FIG. 7 illustrates rotational movement caused by dragging a rotational handle.

Referring now to FIG. 7, selection of a free rotation handle 102 and rotation of the GUI Compass 100 by dragging the rotation handle 102, can cause the objects 315 and 316 to rotate responsive to the direction the free rotation handle 102 is dragged. Selection and movement of the free rotation handle 102 can emulate the types of movement obtainable with a joystick, without the user having to move their hand from a pointing device such as a mouse.

Figure 8:
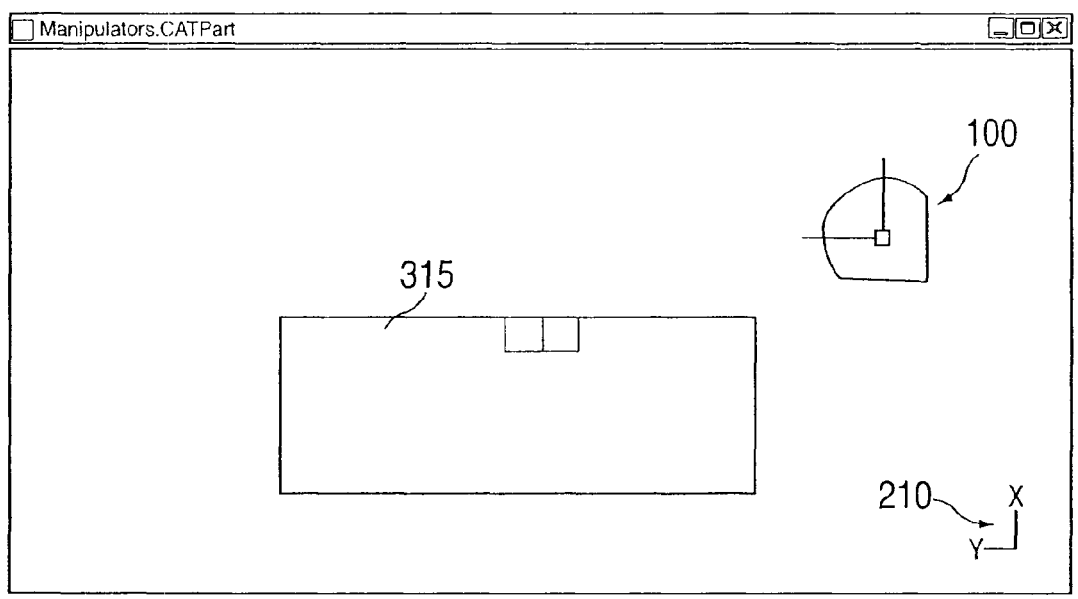
FIG. 8 illustrates an axis becoming perpendicular to the computer screen after selecting the axis letter designation.

Referring now to FIG. 8, clicking or otherwise selecting the letter of an axis on the GUI Compass, or other axis indicator, can cause the selected axis to be perpendicular to the screen. In addition, in another aspect, clicking the same letter again can reverse the point from which a user can view the objects. FIG. 8 illustrates a view of the document containing objects 315 and 316 after the letter Z for the Z axis 112 has been clicked or otherwise selected.

Figure 9:
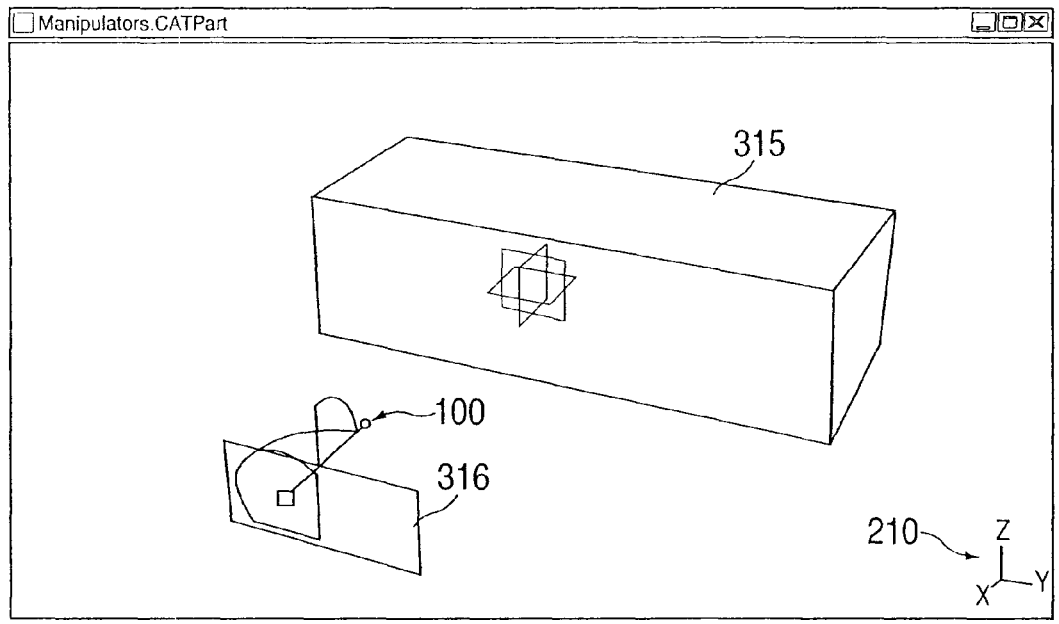
FIG. 9 illustrate anchoring a 3-Compass to an object.

Referring now to FIG. 9, responsive to user actions associating a Compass with an object 316, a Compass can be utilized for different functions. Functions can include for example, translational and rotational movement of an object or connection of one object with another object. Other functionality can also be programmed into the compass according to user needs. An initial position of the Compass tool in relation to an object selected can be a knowledge based mechanism also responsive to the user actions executed during object selection.

A default method of selecting an object can include dragging the compass to the object until the compass is snapped to the object. Default selection of an object can cause the Compass to be functional as a displacement tool whereby the Compass operates to effect object relocation and reorientation. In response to default selection, the Compass anchor can be positioned at the center of gravity for the object, and the Compass orientation can be along the inertia axis. Such default settings can be used to emulate situations in the physical world. For example, a person in the physical world attaching one pipe to another might reasonably grasp the first pipe at the center of gravity and orient the axis of the first pipe to be parallel with the second pipe. The person could then apply translational movement to the first pipe, causing the extremities of each pipe to contact. Similarly, the GUI Compass can attach at the center of gravity of an object such as 316, and manipulate the selected object via the Compass tool.

An alternate method of selecting an object can include activating a command key, such as, for example, by depressing and holding down the Control key of a keyboard associated with the computer 100, while the Compass is dragged to select an object. In one embodiment, alternative selection can activate an advanced use of the tool with a link mechanism, wherein the Compass can become a connection tool for geometrical positioning and part assemblage. During such a use the Compass can be positioned and oriented to define a way of connection. For example, in an assembly context utilizing connection by contact of one object with another, the Z axis of the Compass can be considered the main axis and be oriented tangent to a privileged direction for connection, such as the axis of a pipe.

The selection process can involve contextual, top-down semantical object interpretation. The programming, controlling the object selection, can analyze object characteristics by first determining the current context and then referencing the highest semantical information.

Following selection of an object, the Compass can, by default, become immersed in the 3-D space represented on the screen of the computer. During immersed representation, the Compass appears in close proximity to the selected object. A user can also opt for remote localization should the immersed representation not be easily accessible. Remote localization allows the compass to anchor to a selected object and be controlled by a remote appearance of the compass, such as, for example, a compass that always appears at the upper right corner of the display. Remote localization can be useful when the complexity of objects displayed makes manipulation of an immersed Compass impractical. In the case of remote localization, the user can opt, through the use of a dialog box or other user interactive device, not to display the immersed compass.

Figure 10:
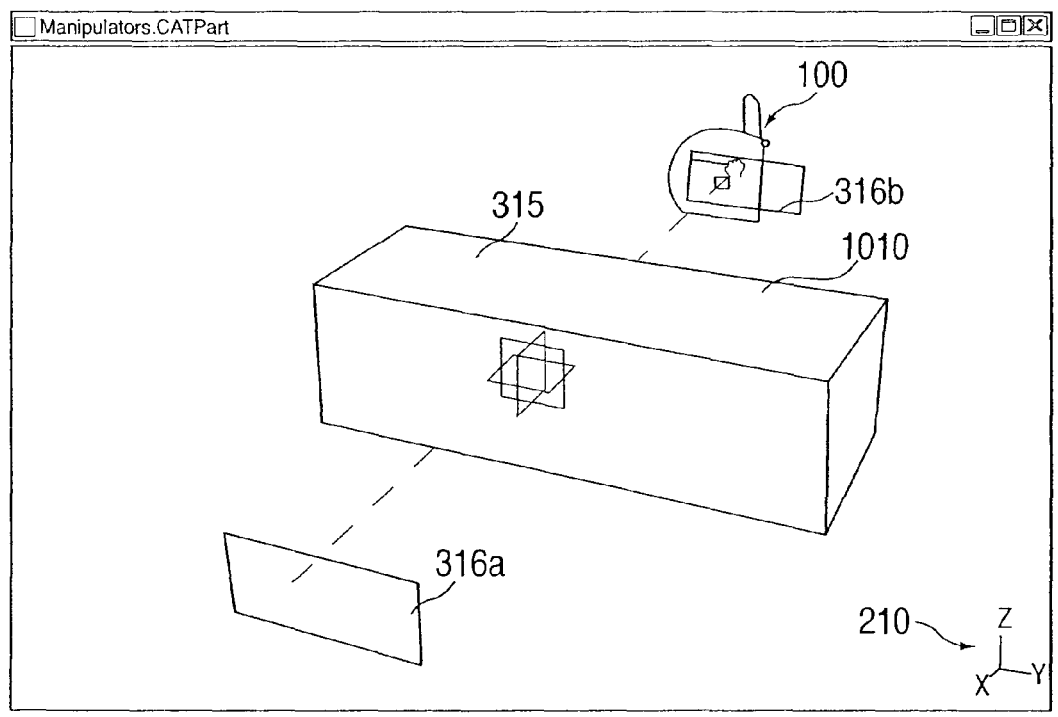
FIG. 10 illustrates movement caused by dragging the axis of an anchored compass.

After the Compass has anchored, only an object that is selected will be responsive to activation of the GUI Compass. An unanchored Compass can control move all objects displayed. For example, dragging the Z axis 112 of the Compass while the Compass 100 is anchored to the planar patch object 316, can move the planar patch to an opposite side of the block object 315. The dragging movement is illustrated in FIG. 10.

Figure 11:
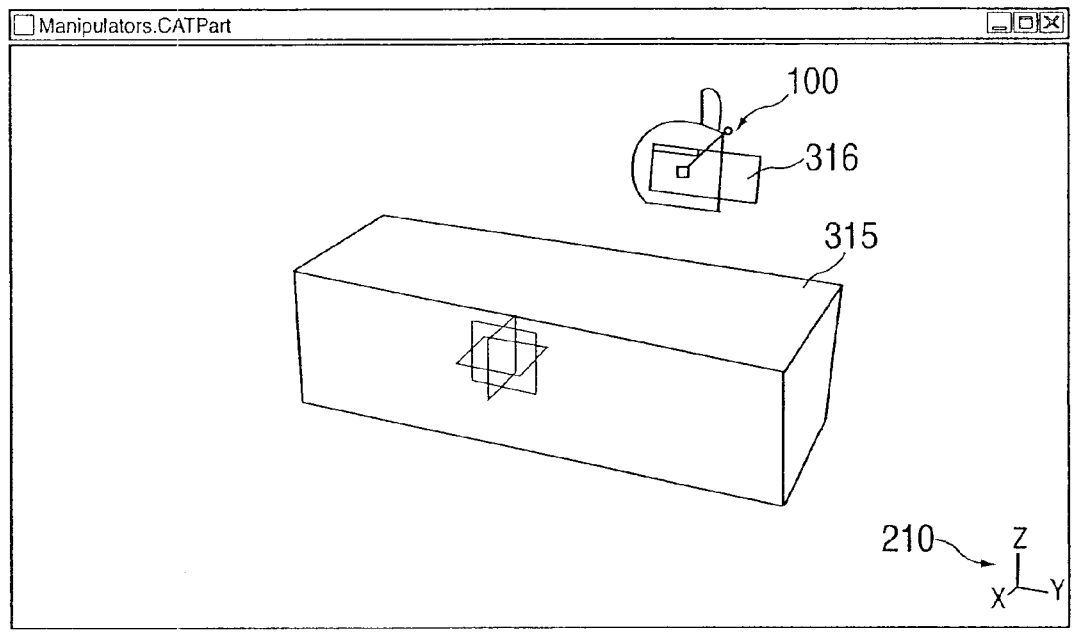
FIG. 11 illustrates a repositioned planar patch following Z translation.

In one embodiment, the distance a selected object is moved, can be displayed in real time as the object is moved 1010. In a preferred embodiment, the distance is measured from the origin of the axis, the anchor square or Compass manipulation handle located at the Compass base. The value displayed 1010, can be preceded by a negative sign if the object is moved in a direction opposite to the Compass orientation. Dotted lines along the X, Y and Z axis and associated values representing the components of displacement can represent the distance of translation. One line can represent axis translation and two lines can represent planar translation. A dotted arc and an associated angle can represent the distance of rotation. Translation and rotation increments can be predetermined, or user definable. FIG. 11 illustrates the repositioned planar patch 316 following the Z direction translation.

Figure 12:
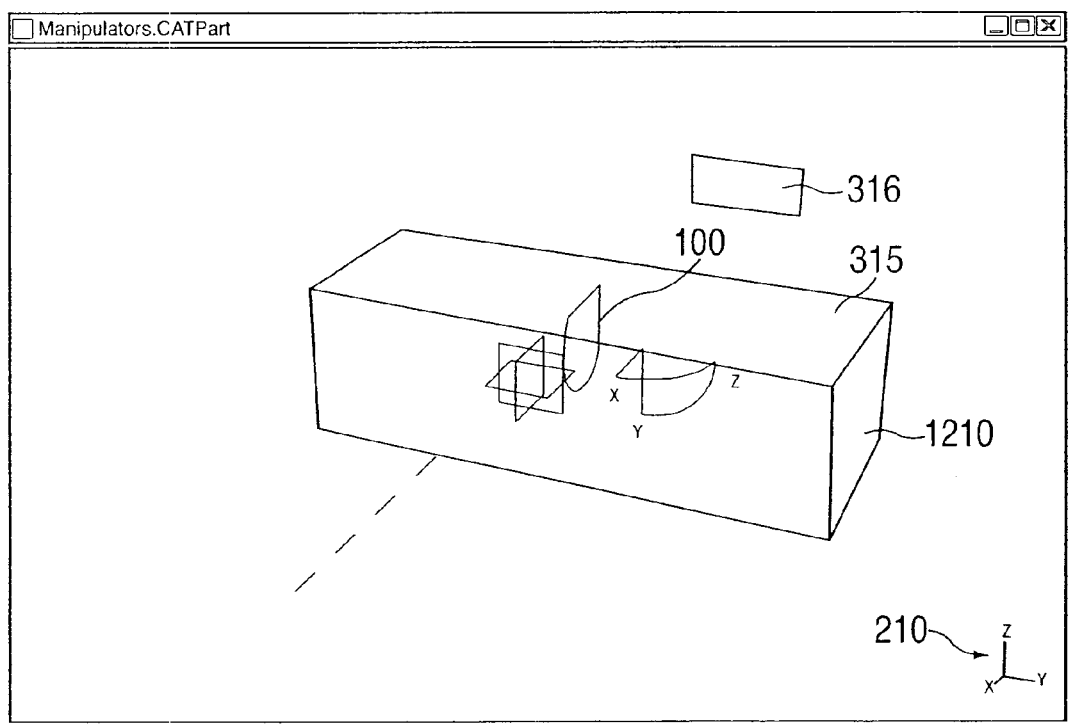
FIG. 12 illustrates alignment of a knowledge-based polymorph undockable toolbar compass with an object edge.

Referring now to FIG. 12, when the anchor of a Compass is selected, the Compass can be snapped to another position and orientation of the same selected object, or another object. The Compass can automatically align with the main characteristic of a part or sub-part pointed to by the cursor. Accordingly, if a sub-part can be assimilated to a point, as when the sub-part is a vertex, a temporary representation of a Compass can be snapped to the point with the Compass anchor located on this point. If the sub-part can be assimilated to a line, as when the sub-part is an edge, the Z axis of the temporary representation can be aligned on this edge. If the sub-part can be assimilated to a plane, the XY plane of the temporary representation can be snapped on this plane.

For example, using this technique, the Compass 100 can be dragged onto the object 315 and aligned with one of the object's edges such as illustrated in FIG. 12 wherein the Compass 100 is aligned with edge 1210. The planar patch 316 can also be selected along with the object 315 by holding down a control key in clicking on the planar patch 316.

Figure 13:
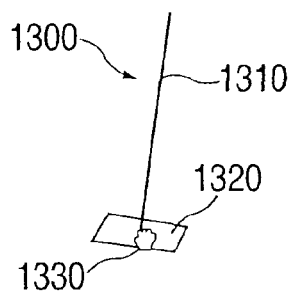
FIG. 13 illustrates using a knowledge-based polymorph undockable toolbar compass as a temporary reference axis.

Referring now to FIG. 13, during creation of an object or during object modification, a GUI Compass can be used as a temporary reference axis. The dissymmetry of a GUI Compass can give visual information, for example, that recognizes the X-Y plane as a privileged plane. For three dimensional object creation or manipulation commands if the a vectoral direction is required, the direction orthogonal to the privileged plane of the Compass can be taken.

If a vectoral plane is required, the privileged plane of a Compass can be used. During movement of a GUI Compass, the shape of the cursor and the Compass can change to aid in anchoring the Compass. As the Compass is dragged an Axis 1310 can be displayed as well as a current privileged plane 1320. By default the Z axis can be displayed in the X-Y plane. Other defaults can be specified and predetermined by a user. The shape of a cursor 1330 can also change while it is dragging the Compass.

Figure 14:
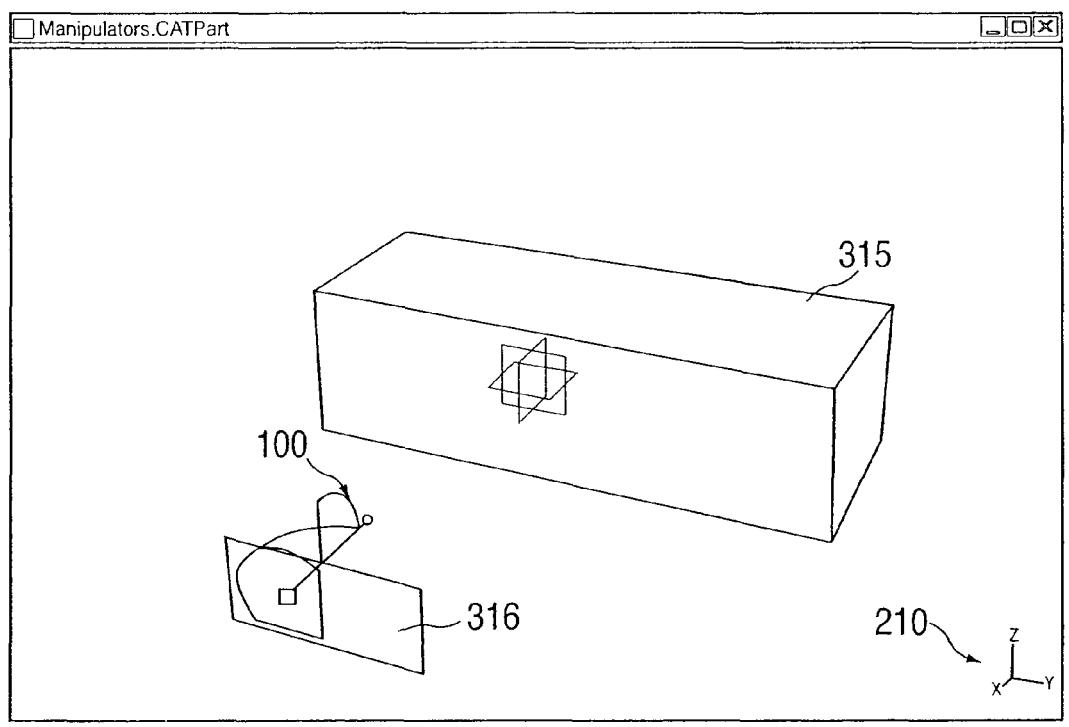
FIG. 14 illustrates an anchored compass.

Release of a mouse button used to drag and drop the Compass can cause the Compass to snap onto an object in closed proximity and thereby selected. FIG. 14 illustrates the Compass attached or anchored to the planar patch 316. Visual indication that the Compass is attached or anchored can also be utilized. For example, a color change can take place as the Compass is attached to an object. A default color such as light green can be used or other user defined colors.

In one embodiment, a user can change the privileged plane from, for example, XY to XZ or YZ. In one embodiment, the privileged plane can be changed by selecting and object such as the plane or patch 316 and activating a control point icon or other user interactive device to cause control points 1520 to appear on the plane or patch 316.

Figure 15:
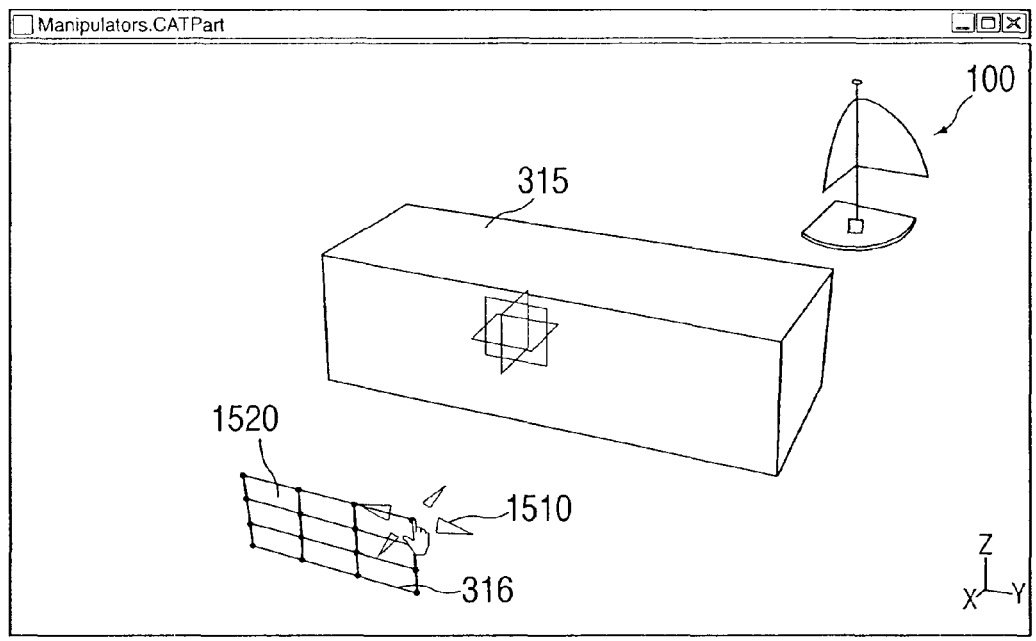
FIG. 15 illustrates a manipulator in conjunction with an object.

Referring now to FIG. 15, manipulators 1510 can be programmed to appear in conjunction with the selected object, the plane or patch 316. By default the manipulators 1510 can be oriented in the same plane as the current privileged plane of the Compass.

In another embodiment, an option accessible for example with a contextual menu can force a privileged plane to be the most visible of the three planes of the Compass. Using this option, as a user changes a point of view of the model displayed, the privileged plane switches.

Figure 16:
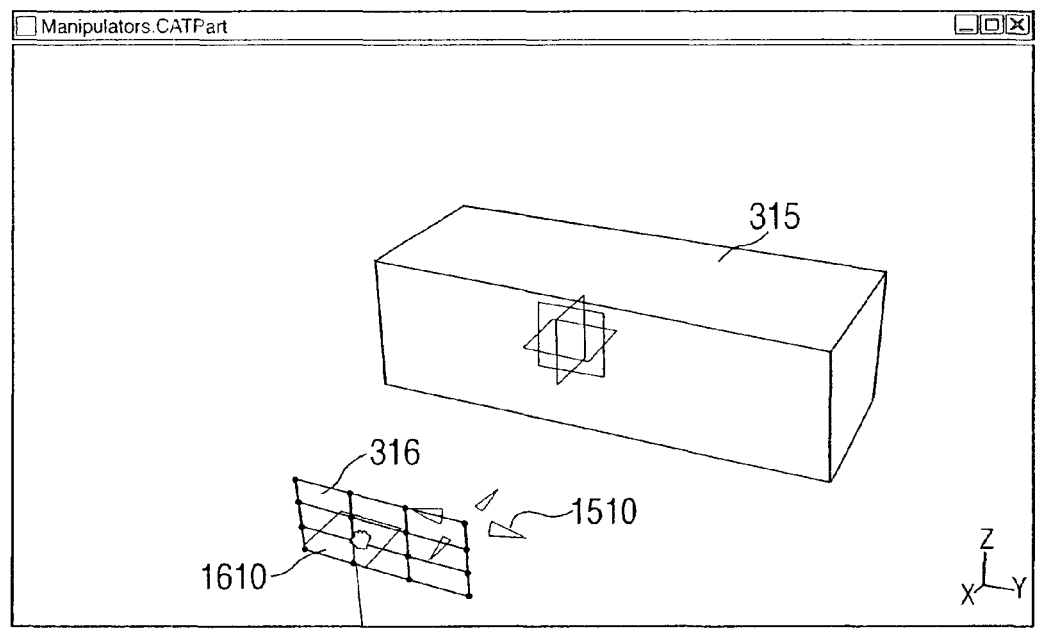
FIG. 16 illustrates a compass dragged onto a planar patch.

Referring now to FIG. 16, the Compass can be dragged onto the plane of a patch 316 and aligned in the direction specifying a newly desired privilege plane. As the Compass is dropped onto the patch by a cursor, the Compass can detect the orientation of the patch.

Figure 17:
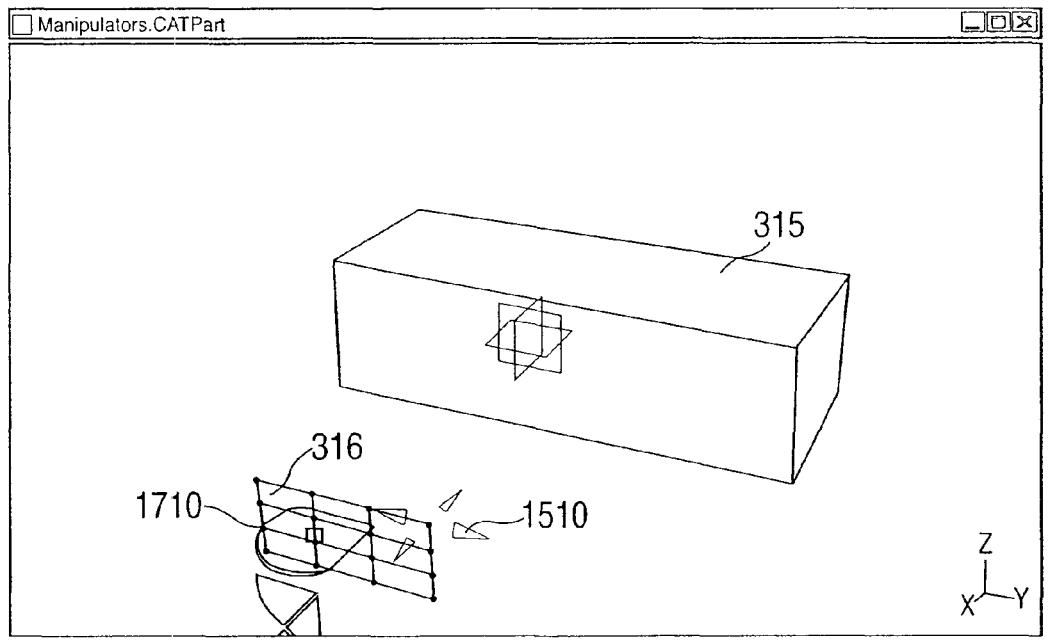
FIG. 17 illustrates a compass oriented according to the orientation of a planar patch.

Referring now to FIG. 17, the Compass can be oriented according to the orientation of a patch 316. In one embodiment, the Compass will retain the orientation of this corresponding privilege plane as it is moved away from the directed object 316. In another embodiment, a user can point to the Compass and right click with a pointing device.

Figure 18:
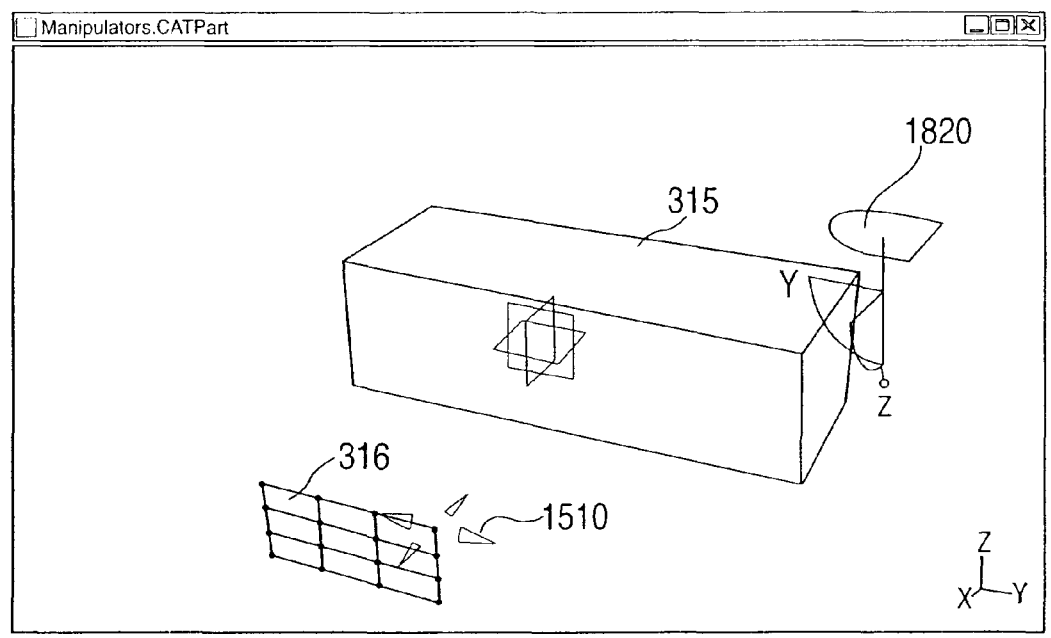
FIG. 18 illustrates a compass reoriented with a privilege plane selected from a menu.

Referring now to FIG. 18, a right click can display a textual menu wherein in the textual menu includes a command to make the respective planes the privileged planes. The manipulators will orient in the plane selected as the privilege plane.

Figure 19:
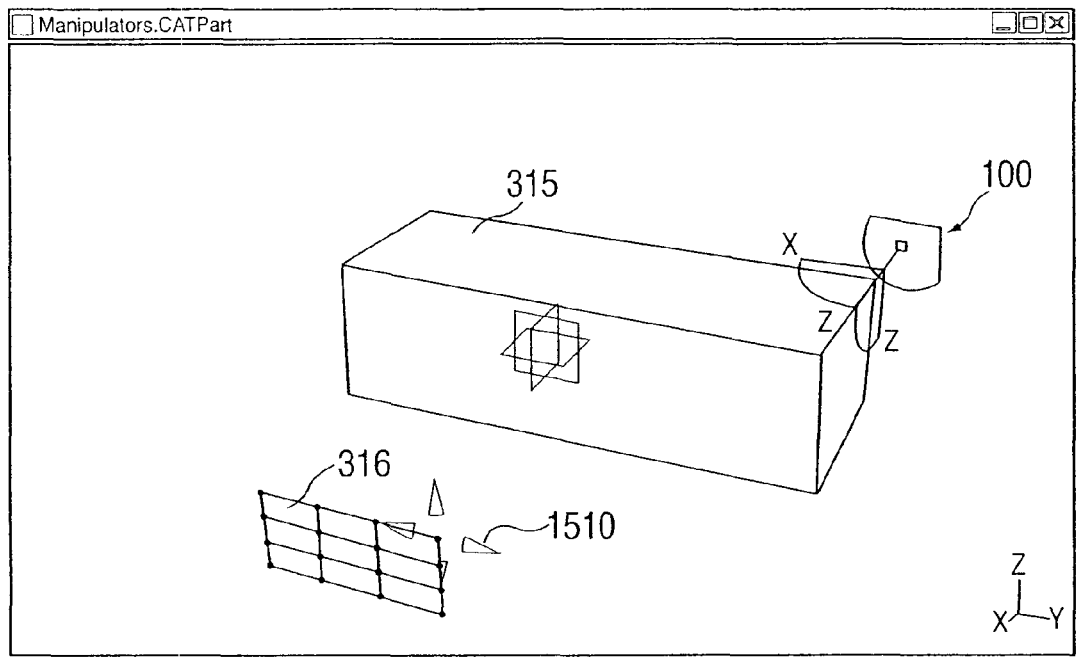
FIG. 19 illustrates the YZ selected as the privileged plane for the compass.

FIG. 19 illustrates the YZ plane selected as the privileged plane for the Compass 100. The manipulators 1510 responsive to the change to the privilege plane are now located in the YZ plane.

Figure 20:
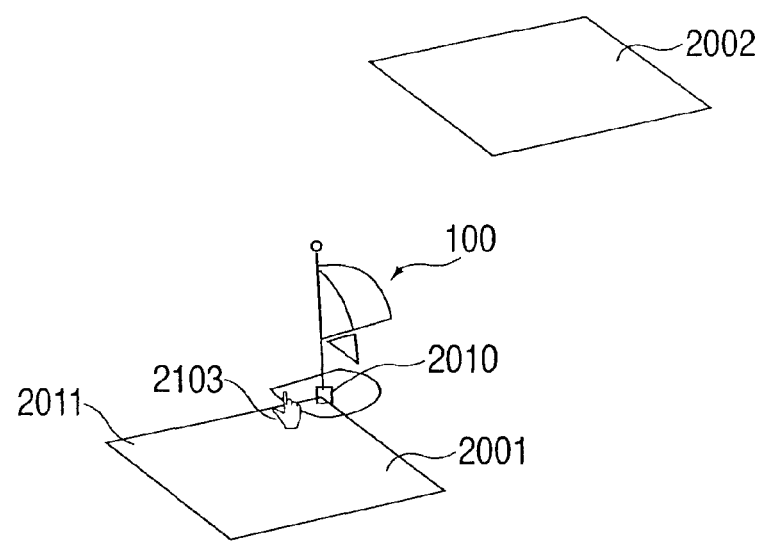
FIG. 20 illustrates a knowledge-based polymorph undockable toolbar compass attached to a rectangular patch.
Figure 21:
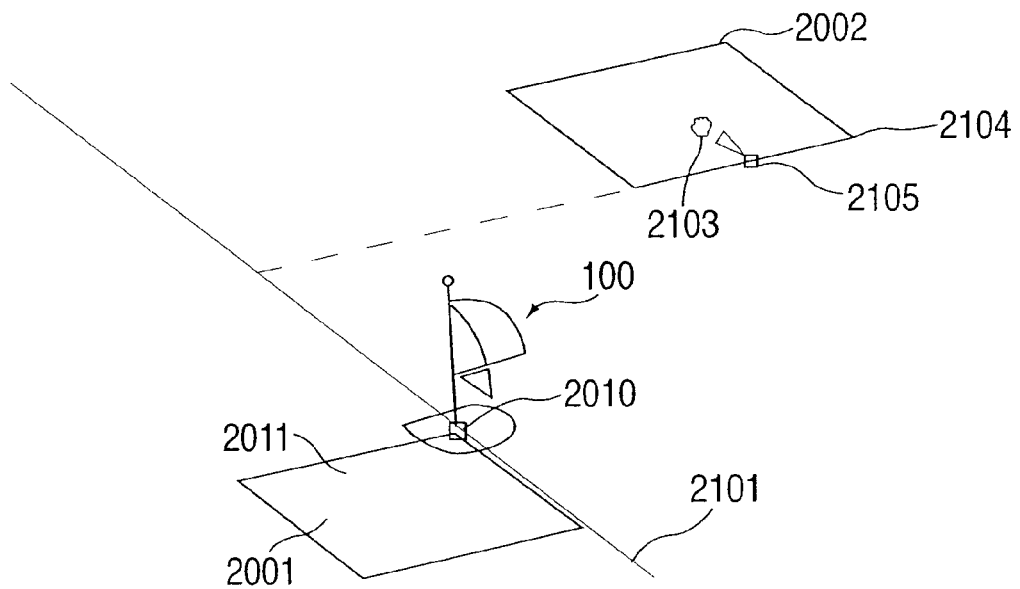
FIG. 21 illustrates alignment during knowledge based translation of an object.
Figure 22:
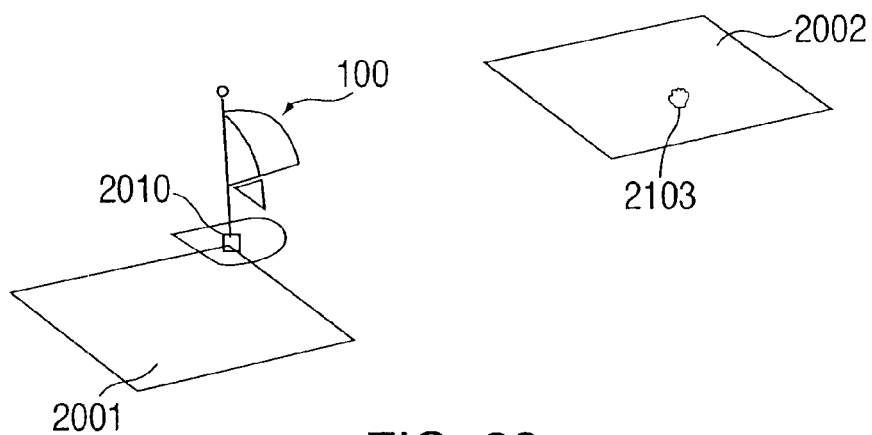
FIG. 22 illustrates translation effected using knowledge based translation.

FIGS. 20-22 illustrate an additional example of a knowledge based action. Object translation is illustrated in the example, however other types of movement including rotation and planar movement can be similarly accomplished. Referring now to FIG. 20, a GUI compass 100 is anchored to a rectangular patch 2001 at a point 2010 along an edge 2011. The cursor 2103 is positioned on the X axis to indicate that the X axis has been selected. The object scene 220 also contains a second rectangular patch 2002. Referring now to FIG. 21, the program uses a knowledge based routine to determine a point 2105 at the border of an edge 2104 of the second rectangular patch 2002, that is nearest to a cursor 2103. The point is determined in response to a user depressing a mouse button, wherein the mouse is controlling the cursor. In addition to the point being determined, a line 2102 normal to the X axis 2101 is extended by the routine to the X axis 2101.

Referring now to FIG. 22, release of the mouse button causes translation of the first rectangular patch 2001 along the X axis of the compass 100 and aligns the line 2102 extended from point 2105 with the anchor point 2010 of the compass 100, wherein the compass is anchored to the first patch.

Figure 23:
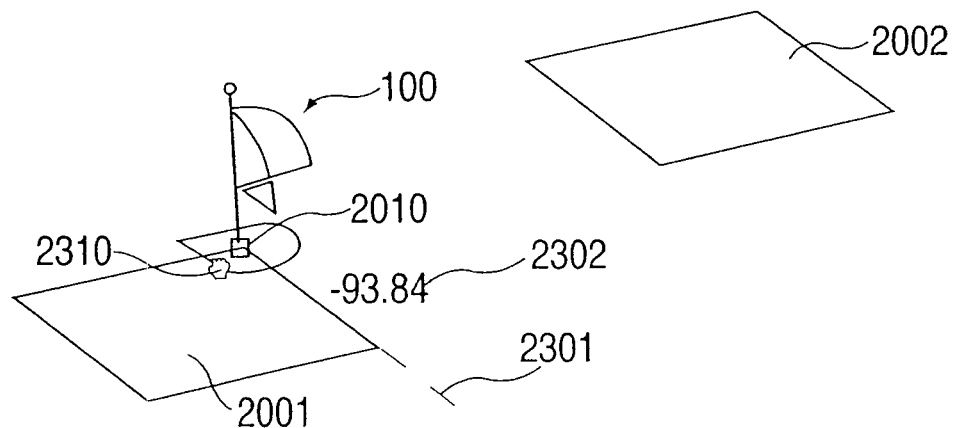
FIG. 23 illustrates alignment during non knowledge-based translation.

Referring now to FIG. 23, an alternate method of effecting translation of the first rectangular patch 2001 that does not utilize knowledge based actions is illustrated. The Compass 100 is anchored at an anchor point 2010 and the user can grasp the Compass by holding down a mouse button while a cursor 2310 is positioned on the Compass 100. The user can then drag the Compass 100 along the X axis causing the first rectangular patch 2001 to translate along the X axis. A dotted line 2301 extending along the X axis can indicate the direction of movement. A numerical value 2302 can indicate the distance along the X axis the Compass 100 has traveled.

Figure 24:
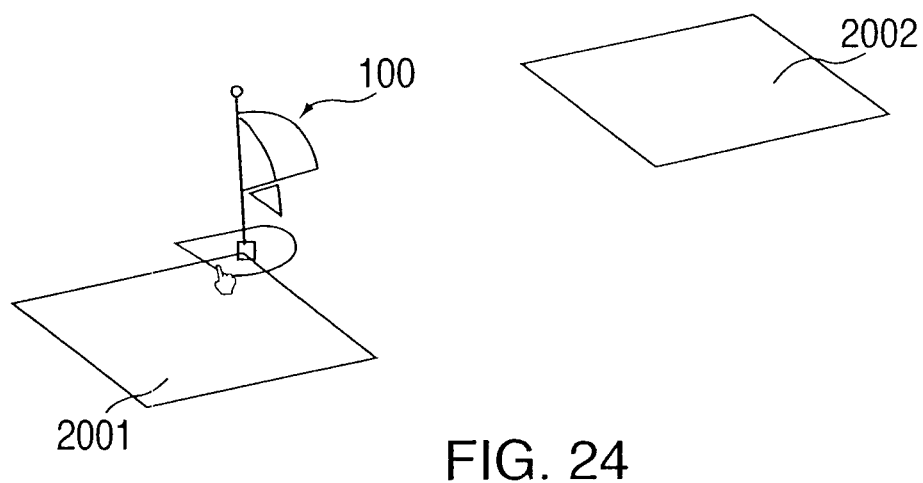
FIG. 24 illustrates translation effected using non knowledge based translation.

Referring now to FIG. 24, a user can visually align the anchor point 2010 with the edge 2104 of the second rectangular patch 2002 and release the mouse button causing the translational movement to stop. Non-knowledge based movement does not include a programmed confirmation of the alignment of the two objects. In the example illustrated, alignment is as accurate as the users perception. Knowledge based actions can have predetermined accuracy programmed in.

Figure 25:
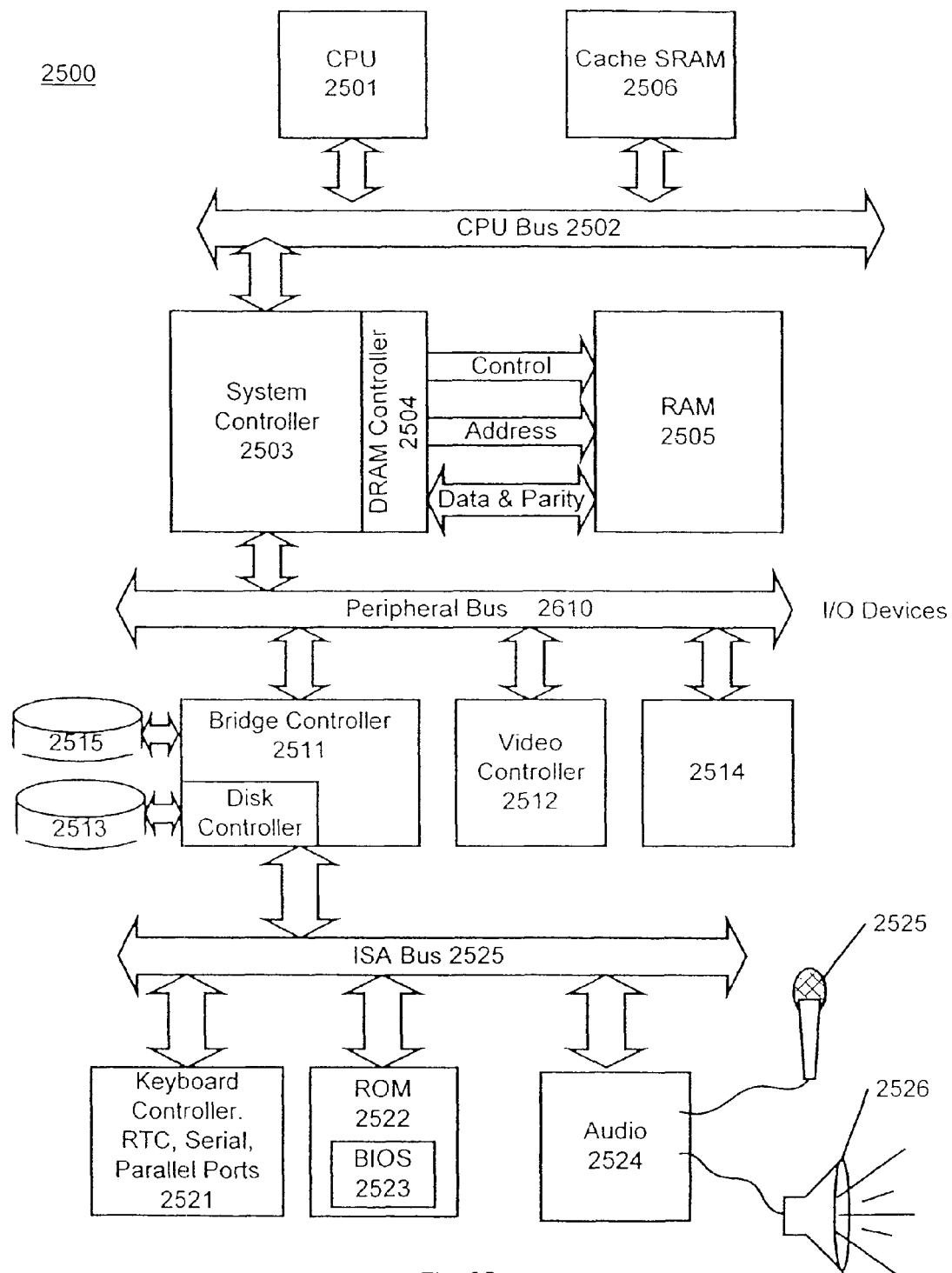
FIG. 25 is a block diagram of a computer system.

Referring to FIG. 25 physical resources of a computer system 2500 are depicted. The computer 2500 has a central processor 2501 connected to a processor host bus 2502 over which it provides data, address and control signals. The processors 2501 may be any conventional general purpose single-chip or multi-chip microprocessor such as a Pentium® series processor, A K6 processor, a MIPS® processor, a Power PC® processor or an ALPHA® processor. In addition, the processor 2501 may be any conventional special purpose microprocessor such as a digital signal processor or a graphics processor. The microprocessor 2501 can have conventional address, data, and control lines coupling it to a processor host bus 2502.

The computer 2500 can include a system controller 2503 having an integrated RAM memory controller 2504. The system controller 2503 can be connected to the host bus 2502 and provide an interface to random access memory 2505. The system controller 2503 can also provide host bus to peripheral bus bridging functions. The controller 2503 can thereby permit signals on the processor host bus 2502 to be compatibly exchanged with signals on a primary peripheral bus 2510. The peripheral bus 2510 may be, for example, a Peripheral Component Interconnect (PCI) bus, an Industry Standard Architecture (ISA) bus, or a Micro-Channel bus. Additionally, the controller 2503 can provide data buffering and data transfer rate matching between the host bus 102 and peripheral bus 2510. The controller 2503 can thereby allow, for example, a processor 2501 to interface to a PCI bus 2510 having a data patch differing in data path bit width, clock speed, or data transfer rate.

Accessory devices including, for example, a hard disk drive control interface 2511 coupled to a hard disk drive 2514, a video display controller 2512 coupled to a video display 2515, and a keyboard and mouse controller 2513 can be coupled to a peripheral bus 2510 and controlled by the processor 2501. The computer system can include a connection to a computer system network, an intranet or an interne. Data and information may be sent and received over such a connection.

The computer 2500 can also include nonvolatile ROM memory 2507 to store basic computer software routines. ROM 2507 may include alterable memory, such as EEPROM (Electronically Erasable Programmable Read Only Memory), to store configuration data. BIOS routines 2523 can be included in ROM 2507 and provide basic computer initialization, systems testing, and input/output (I/O) services. The BIOS 2523 can also include routines that allow an operating system to be "booted" from the disk 2513. Examples of high-level operating systems are, the Microsoft Windows 98™, Windows NT™, UNIX, LINUX, the Apple MacOS™ operating system, or other operating system.

An operating system may be fully loaded in the RAM memory 2505 or may include portions in RAM memory 2505, disk drive storage 2514, or storage at a network location. The operating system can provide functionality to execute software applications, software systems and tools of software systems. Software functionality can access the video display controller 2512 an other resources of the computer system 2500 to provide two dimensional (2-D) and three dimensional (3-D) models on the video computer display 2515.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

The invention claimed is:

1. A computer aided design station for manipulating a three-dimensional scene including at least one object, comprising:

a display operably linked to the design station to display the three-dimensional scene including the at least one object;

a three-dimensional icon, separate from the at least one object, displayed in the three-dimensional scene on the display, the three-dimensional icon including at least one axis segment to cause translational movement of the at least one object;

an input unit operably linked to the design station to receive in tandem a two-dimensional movement signal to move the at least one object and a selection signal to select the at least one axis segment for operation; and a processor operably linked to the input unit to render, based on the two-dimensional movement signal and while the selection signal persistently selects the at least one axis segment, a one-dimensional translational movement of the at least one object exclusively along a scene axis parallel to the selected axis segment.

2. The computer aided design station according to claim 1, wherein the three-dimensional icon includes a designated area to anchor the three-dimensional icon to the at least one object.

3. The computer aided design station according to claim 1, wherein the three-dimensional icon includes a free rotation handle, and when the free rotation handle is selected for operation by the selection signal, the processor renders movement of the at least one object in a direction of rotation of the free rotation handle on the display in response to the two-dimensional movement signal.

4. The computer aided design station according to claim 2, wherein the three-dimensional icon is anchored to a subset of objects included in the three-dimensional scene, and the processor renders movement of the subset of objects based on the two-dimensional movement signal and while the at least one axis segment is persistently selected for operation by the selection signal.

5. The computer aided design station according to claim 4, wherein the processor renders movement of all objects in the three-dimensional scene based on the two-dimensional movement signal and while the selection signal persistently selects the at least one axis segment for operation, when the three-dimensional icon is unanchored.

6. The computer aided design station according to claim 5, wherein the three-dimensional icon is aligned with an absolute axis of the scene, when the three-dimensional icon is unanchored.

7. The computer aided design station according to claim 1, wherein the three-dimensional icon is operationally coupled to the at least one object to cause direct movement of the at least one object in the three-dimensional scene based on the two-dimensional movement signal and while the selection signal persistently selects the at least one axis segment for operation.

8. The computer aided design station according to claim 7, wherein the processor renders a position and orientation of the three-dimensional icon relative to the at least one object in the three-dimensional scene based on semantic information associated with the at least one object.

9. A method of manipulating a three-dimensional scene including at least one object on a graphics display, comprising:

selecting the at least one object;

displaying, in the three-dimensional scene on the graphics display, a three-dimensional icon that is separate from the at least one object and that includes at least one axis segment to cause translational movement of the at least one object;

receiving in tandem, via an interface of the graphics display, a two dimensional movement signal to move the at least one object and a selection signal to select the at least one axis segment for operation; and rendering on the graphics display, based on the two-dimensional movement signal and while the selection signal persistently selects the at least one axis segment, a one-dimensional translational movement of the at least one object exclusively along a scene axis parallel to the selected at least one axis segment.

10. The method according to claim 9, further comprising:
rendering movement of the at least one object in a direction of rotation of a free rotation handle on the display in response to the two-dimensional movement signal, the free rotation handle being included in the three-dimensional icon.

11. The method according to claim 9, further comprising:
anchoring the three-dimensional icon to a subset of objects included in the three-dimensional scene; and
rendering movement of the subset of objects based on the two-dimensional movement signal and while the selection signal persistently selects the at least one axis segment for operation.

12. The method according to claim 11, further comprising:
rendering movement of all objects in the three-dimensional scene based on the two-dimensional movement signal and while the selection signal persistently selects the at least one axis segment, when the three-dimensional icon is unanchored.

13. The method according to claim 12, wherein the three-dimensional icon is aligned with an absolute axis of the scene, when the three-dimensional icon is unanchored.

14. The method according to claim 9, further comprising:
operationally coupling the three-dimensional icon to the at least one object to cause direct movement of the at least one object in the three-dimensional scene based on the two-dimensional movement signal and while the selection signal persistently selects the at least one axis segment for operation.

15. The method according to claim 14, further comprising:
rendering a position and orientation of the three-dimensional icon relative to the at least one object in the three-dimensional scene based on semantic information associated with the at least one object.

16. A non-transitory computer-readable medium storing computer-readable instructions thereon, the computer-readable instructions when executed by a computer cause the computer to perform a method comprising:
selecting at least one object in a three-dimensional scene on a graphics display;
displaying, in the three-dimensional scene on the graphics display, a three-dimensional icon that is separate from the at least on object and that includes at least one axis segment to cause translational movement of the at least one object;
receiving in tandem a two dimensional movement signal to move the at least one object and a selection signal to select the at least one axis segment for operation; and
rendering on the graphics display, based on the two-dimensional movement signal and while the selection signal persistently selects the at least one axis segment, a one-dimensional translational movement of the at least one object exclusively along a scene axis parallel to the selected at least one axis segment.

17. The non-transitory computer-readable medium according to claim 16, further comprising:
rendering movement of the at least one object in a direction of rotation of a free rotation handle on the display in response to the two-dimensional movement signal, the free rotation handle being included in the three-dimensional icon.

18. The non-transitory computer-readable medium according to claim 16, further comprising:
anchoring the three-dimensional icon to a subset of objects included in the three-dimensional scene; and
rendering movement of the subset of objects based on the two-dimensional movement signal and while the selection signal persistently selects the at least one axis segment for operation.

19. The non-transitory computer-readable medium according to claim 18, further comprising:
rendering movement of all objects in the three-dimensional scene based on the two-dimensional movement signal and while the selection signal persistently selects the at least one axis segment, when the three-dimensional icon is unanchored.

20. The non-transitory computer-readable medium according to claim 18, wherein the three-dimensional icon is aligned with an absolute axis of the scene, when the three-dimensional icon is unanchored.

21. The non-transitory computer-readable medium according to claim 16, further comprising:
operationally coupling the three-dimensional icon to the at least one object to cause direct movement of the at least one object in the three-dimensional scene based on the two-dimensional movement signal and while the selection signal persistently selects the at least one axis segment for operation.

22. The non-transitory computer-readable medium according to claim 21, further comprising:
rendering a position and orientation of the three-dimensional icon relative to the at least one object in the three-dimensional scene based on semantic information associated with the at least one object.

23. A computer aided design station for manipulating a three-dimensional scene including at least one object, comprising:
a display operably linked to the design station to display the three-dimensional scene including the at least one object;
a three-dimensional icon, separate from the at least one object, displayed in the three-dimensional scene on the display, the three-dimensional icon including at least one arc to cause rotational movement of the at least one object;
an input unit operably linked to the design station to receive in tandem a two-dimensional movement signal to move the at least one object and a selection signal to select the at least one arc for operation; and
a processor operably linked to the input unit to render, based on the two-dimensional movement signal and while the selection signal persistently selects the at least one arc, a rotational movement of the at least one object exclusively about a scene axis of rotation parallel to an axis of rotation of the selected at least one arc.

24. The computer aided design station according to claim 23, wherein the three-dimensional icon includes a designated area to anchor the three-dimensional icon to the at least one object.

25. The computer aided design station according to claim 23, wherein the three-dimensional icon includes a free rotation handle, and when the free rotation handle is selected for operation by the selection signal, the processor renders movement of the at least one object in a direction of rotation of the free rotation handle on the display in response to the two-dimensional movement signal.

26. The computer aided design station according to claim 24, wherein the three-dimensional icon is anchored to a subset of objects included in the three-dimensional scene, and the processor renders movement of the subset of objects based on the two-dimensional movement signal and while the at least one arc is persistently selected for operation by the selection signal.

27. The computer aided design station according to claim 26, wherein the processor renders movement of all objects in the three-dimensional scene based on the two-dimensional movement signal and while the selection signal persistently selects the at least one arc for operation, when the three-dimensional icon is unanchored.

28. The computer aided design station according to claim 27, wherein the three-dimensional icon is aligned with an absolute axis of the scene, when the three-dimensional icon is unanchored.

29. The computer aided design station according to claim 23, wherein the three-dimensional icon is operationally coupled to the at least one object to cause direct movement of the at least one object in the three-dimensional scene based on the two-dimensional movement signal and while the selection signal persistently selects the at least one arc for operation.

30. The computer aided design station according to claim 29, wherein the processor renders a position and orientation of the three-dimensional icon relative to the at least one object in the three-dimensional scene based on semantic information associated with the at least one object.

31. A method of manipulating a three-dimensional scene including at least one object on a graphics display, comprising:
    selecting the at least one object;
    displaying, in the three-dimensional scene on the graphics display, a three-dimensional icon that is separate from the at least one object and that includes at least one arc to cause rotational movement of the at least one object;
    receiving in tandem, via an interface of the graphics display, a two dimensional movement signal to move the at least one object and a selection signal to select the at least one arc for operation; and
    rendering on the graphics display, based on the two-dimensional movement signal and while the selection signal persistently selects the at least one arc, a rotational movement of the at least one object exclusively about a scene axis of rotation parallel to an axis of rotation of the selected at least one arc.

32. The method according to claim 31, further comprising:
    rendering movement of the at least one object in a direction of rotation of a free rotation handle on the display in response to the two-dimensional movement signal, the free rotation handle being included in the three-dimensional icon.

33. The method according to claim 31, further comprising:
    anchoring the three-dimensional icon to a subset of objects included in the three-dimensional scene; and
    rendering movement of the subset of objects based on the two-dimensional movement signal and while the selection signal persistently selects the at least one arc for operation.

34. The method according to claim 33, further comprising:
    rendering movement of all objects in the three-dimensional scene based on the two-dimensional movement signal and while the selection signal persistently selects the at least one arc, when the three-dimensional icon is unanchored.

35. The method according to claim 34, wherein the three-dimensional icon is aligned with an absolute axis of the scene, when the three-dimensional icon is unanchored.

36. The method according to claim 31, further comprising:
    operationally coupling the three-dimensional icon to the at least one object to cause direct movement of the at least one object in the three-dimensional scene based on the two-dimensional movement signal and while the selection signal persistently selects the at least one arc for operation.

37. The method according to claim 36, further comprising:
    rendering a position and orientation of the three-dimensional icon relative to the at least one object in the three-dimensional scene based on semantic information associated with the at least one object.

38. A non-transitory computer-readable medium storing computer-readable instructions thereon, the computer-readable instructions when executed by a computer cause the computer to perform a method comprising:
    selecting at least one object in a three-dimensional scene on a graphics display;
    displaying, in the three-dimensional scene on the graphics display, a three-dimensional icon that is separate from the at least one object and that includes at least one arc to cause rotational movement of the at least one object;
    receiving in tandem a two dimensional movement signal to move the at least one object and a selection signal to select the at least one arc for operation; and
    rendering on the graphics display, based on the two-dimensional movement signal and while the selection signal persistently selects the at least one arc, a rotational movement of the at least one object exclusively along a scene axis of rotation parallel to an axis of rotation of the selected at least one arc.

39. The non-transitory computer-readable medium according to claim 38, further comprising:
    rendering movement of the at least one object in a direction of rotation of a free rotation handle on the display in response to the two-dimensional movement signal, the free rotation handle being included in the three-dimensional icon.

40. The non-transitory computer-readable medium according to claim 38, further comprising:
    anchoring the three-dimensional icon to a subset of objects included in the three-dimensional scene; and
    rendering movement of the subset of objects based on the two-dimensional movement signal and while the selection signal persistently selects the at least one arc for operation.

41. The non-transitory computer-readable medium according to claim 40, further comprising:
    rendering movement of all objects in the three-dimensional scene based on the two-dimensional movement signal and while the selection signal persistently selects the at least one arc, when the three-dimensional icon is unanchored.

42. The non-transitory computer-readable medium according to claim 41, wherein the three-dimensional icon is aligned with an absolute axis of the scene, when the three-dimensional icon is unanchored.

43. The non-transitory computer-readable medium according to claim 38, further comprising:
   operationally coupling the three-dimensional icon to the at least one object to cause direct movement of the at least one object in the three-dimensional scene based on the two-dimensional movement signal and while the selection signal persistently selects the at least one arc for operation.

44. The non-transitory computer-readable medium according to claim 43, further comprising:
   rendering a position and orientation of the three-dimensional icon relative to the at least one object in the three-dimensional scene based on semantic information associated with the at least one object.

* * * * *